US010818115B1

(12) United States Patent
Allibhoy et al.

(10) Patent No.: US 10,818,115 B1
(45) Date of Patent: Oct. 27, 2020

(54) GUEST MANAGEMENT SYSTEM

(71) Applicant: Intelity, Inc., Los Angeles, CA (US)

(72) Inventors: Nizar Allibhoy, Northridge, CA (US); Justin Leung, Rancho Palos Verdes, CA (US); Roman Mazur, Kyiv (UA)

(73) Assignee: Intelity, Inc., Los Angeles, CA (US)

( * ) Notice: Subject to any disclaimer, the term of this patent is extended or adjusted under 35 U.S.C. 154(b) by 0 days.

(21) Appl. No.: 16/703,595

(22) Filed: Dec. 4, 2019

Related U.S. Application Data

(63) Continuation of application No. 16/015,948, filed on Jun. 22, 2018, now Pat. No. 10,521,988, which is a continuation-in-part of application No. 15/483,932, filed on Apr. 10, 2017, now Pat. No. 10,062,232, which is a continuation of application No. 15/016,636, filed on Feb. 5, 2016, now Pat. No. 9,619,954.

(60) Provisional application No. 62/112,534, filed on Feb. 5, 2015, provisional application No. 62/523,657, filed on Jun. 22, 2017.

(51) Int. Cl.
*G05B 19/00* (2006.01)
*G07C 9/00* (2020.01)

(52) U.S. Cl.
CPC ..... *G07C 9/00309* (2013.01); *G07C 9/00904* (2013.01); *G07C 2009/00793* (2013.01)

(58) Field of Classification Search
None
See application file for complete search history.

(56) References Cited

U.S. PATENT DOCUMENTS

| | | | | |
|---|---|---|---|---|
| 6,486,793 | B1 | 11/2002 | Buccola | |
| 2012/0005035 | A1* | 1/2012 | Hong | G06Q 30/02 705/26.1 |
| 2012/0280783 | A1* | 11/2012 | Gerhardt | G07C 9/00309 340/5.6 |
| 2015/0027178 | A1 | 1/2015 | Scalisi | |
| 2018/0110093 | A1* | 4/2018 | Deros | H01R 31/065 |
| 2018/0343539 | A1* | 11/2018 | Oppenheim | H04W 4/80 |

OTHER PUBLICATIONS

EP 16889611, Extended European Search Report, dated Aug. 28, 2019.

* cited by examiner

*Primary Examiner* — Adolf Dsouza
(74) *Attorney, Agent, or Firm* — Rimon Law

(57) ABSTRACT

A guest management system configured to facilitate the provision of services to guest. A guest's personal computing device, and provided computing devices, are used to request and receive products and services. The services provided may be tacked and scored based on either feedback from guests and/or objective measurements of the performance of service providers. Services are optionally dependent on an automatically determined location of a guest and may include access to third party accounts of the guests.

3 Claims, 2 Drawing Sheets

GUEST MANAGEMENT SYSTEM

CROSS-REFERENCE TO RELATED APPLICATIONS

This application is a continuation of U.S. patent application Ser. No. 16/015,948 filed on Jun. 22, 2018 which is a Continuation-in-Part of U.S. patent application Ser. No. 15/483,932 filed Apr. 10, 2017; U.S. patent application Ser. No. 15/483,932 is a continuation of U.S. patent application Ser. No. 15/016,636 filed Feb. 5, 2016 which claims priority and benefit to U.S. Provisional patent application 62/112,534 filed Feb. 5, 2015; U.S. patent application Ser. No. 16/015,948 also claims priority and benefit of U.S. provisional patent application No. 62/523,657 filed Jun. 22, 2017. The disclosures of all the above patent applications are hereby incorporated herein by reference.

BACKGROUND

Field of the Invention

The invention is in the field of computer-based management systems, and specifically in the field of guest and service management.

Related Art

Existing systems for managing room reservations allow a guest to make a reservation over a computing network. The reservation may then be viewed on a display device of a service provider, such as a terminal at a hotel registration desk.

SUMMARY

A guest management system includes end-to-end integration of computing devices configured for management of reservations, service requests, provision of services, security, billing and a wide range of other functions. This system may be used for the management of hotels, rental units, resorts, hospitals, residential communities, apartments, ships, aircraft, and/or other facilities that host guests. Components of the system include devices configured for a guest to control room access (e.g., locks), make service requests, and/or control various IoT (internet of things) devices; devices for service providers to receive and acknowledge the services requests; and/or devices configured to manage and coordinate the provision of services request.

Various embodiments include tracking of service requests. Detailed tracking and real-time feedback of services requests can enable scoring of the fulfillment process and can also provide an opportunity to correct errors or deficiencies in the service provided. Scores can be used to identify points of failure in specific processes and/or to rate the overall quality of service provisional at an institution.

Various embodiments include automatic provisioning of devices to reflect a guest's preferences. For example, a guest may be presented with a menu of their favorite items. Further, facility devices may be automatically provisioned for guests to have access to his/her personal accounts—using private account data of the guest. For example, a display system may be provisioned to automatically log into a guest's Netflix account or Wall Street Journal Subscription.

Many of the features disclosed herein are optionally dependent on location of a facility or guest device. For example, a menu of services provided in a guest's room may differ from a menu provided beside an outdoor swimming pool. Such menus may also be dependent on a guest's preferences, history, identity, party size, group membership, time of day, spending, etc. As used herein, a service is mean to include both providing a service and providing a product.

Security of the systems discussed herein are optionally enhanced by automatic creation of personal device networks, e.g., private domains, virtual private networks (VPNs) or Local Area Networks (LAN). Such networks can include guest devices, facility devices, and/or IoT devices associated with a guest stay at a facility. Establishing a personal device network allows, for example, a guest to control a facility television or room thermostat using the guest's personal smartphone. It also provides an ability to de-provision the network upon guest checkout.

Various embodiments of the invention include a guest management system comprising: guest interface logic configured for communicating between a guest management server and a computing device of a guest, and to receive a service request from the computing device of the guest; services interface logic configured for communicating between the management server and computing devices of service providers, and to send a notice of the service request to the computing devices of the service providers; request state logic configured to track a progress state of the service request, the progress state being based on a workflow associated with the service request and status information received from the service providers; and checkoff logic configured to receive an acknowledgement that the service request is completed. In some embodiments one workflow may trigger a series of artifacts/actions which in turn would include additional workflows or external events and notifications.

Various embodiments of the invention include a guest management system comprising: guest interface logic configured for communicating between a management and a computing device of a guest, and to receive a service request from the computing device of the guest; services interface logic configured for communicating between the management server and computing devices of service providers, and to send a notice of the service request to the computing devices of the service providers; checkoff logic configured to receive an acknowledgement that the service request is completed; analysis logic configured to score completion of the service request based on feedback from the guest or data generated by tracking completion of the service request; and a microprocessor configured to execute at least the analysis logic.

Various embodiments of the invention include a guest management system comprising: guest profile storage configured to store a profile of a guest, the profile including preferences of the guest, third party account data of the guest, or a service history of the guest; reservation management logic configured to associate a computing device of the guest with a room, the computing device of the guest being associated with the profile of the guest; guest interface logic configured for communicating between a management server and the computing device of a guest; provisioning logic configured to provision the computing device of the guest responsive to the profile of the guest; and a microprocessor configured to execute at least the provisioning logic. Provisioned devices may include "common area devices" that are dynamically provisioned for the guest by simply picking up the device from the charging cradle. Once the device is placed back in the dock, the device is deprovisioned. Thus, a device at a pool side, a common waiting area or at a dinner table may be temporally provisioned for use by a specific guest.

Various embodiments of the invention include a guest management system comprising: guest interface logic configured for communicating between a guest management server and a computing device of a guest, to provide a menu of services to the guest, and to receive a service request from the computing device of the guest, wherein the menu of services is dependent on a location of the computing device of the guest; services interface logic configured for communicating between the guest management server and computing devices of service providers, and to send a notice of the service request to the computing devices of the service providers; and checkoff logic configured to receive an acknowledgement that the service request is completed.

Various embodiments of the invention include a patient management system comprising: guest interface logic configured for communicating between a guest management server and a computing device of a guest, to provide a menu of services to the guest, and to receive a service request from the computing device of the guest, the guest being a guest of the patient, wherein the menu of services is dependent on medical information regarding the patient; services interface logic configured for communicating between the guest management server and computing devices of service providers, and to send a notice of the service request to the computing devices of the service providers; and checkoff logic configured to receive an acknowledgement that the service request is completed.

Various embodiments of the invention include a method of providing services to a guest, the method comprising: offering a menu of services to a guest; receiving a service request for a service from the guest; queuing the received service request; preparing materials needed to fulfil the request; providing the requested service to the guest; confirming a completion of the service request; receiving feedback from the guest regarding the provided service; analyzing the provision of the service, the analyzing including determining if the provision of the service was poor based on the received feedback and an objective analysis of a log of the provision of the service; recovering from a poor performance of the provided service, the recovering including automatically providing a compensation to the guest.

Various embodiments of the invention include a method of provisioning a computing device, the method comprising: receiving a reservation for a room, the reservation being associated with at least one guest; identifying a profile of the guest, the profile including an identity of a guest device associated with the guest; assigning a room at a facility to the reservation; providing a lock code configured to provide access to the room; detecting presence of the guest near the facility; identifying a room device associated with the room; and provisioning the room device based on the profile of the guest.

Various embodiments of the invention include a method of providing a services menu, the method comprising: receiving a reservation for use of a facility by a guest; identifying a profile, the profile including an identity of at least one guest device of the guest and preference of the guest; detecting presence of the guest device near the facility; parsing preferences of the guest stored in the profile, the preferences being based on a history of services requested by the guest; identifying available services at the facility; generating a menu based on the preferences of the guest and the identified available services; and offering the menu to the guest.

In various embodiments, a guest experience may be customized based on property specific characteristics, guest specific characteristics, reservation specific characteristics and device specific characteristics.

DETAILED DESCRIPTION

Figure 1:
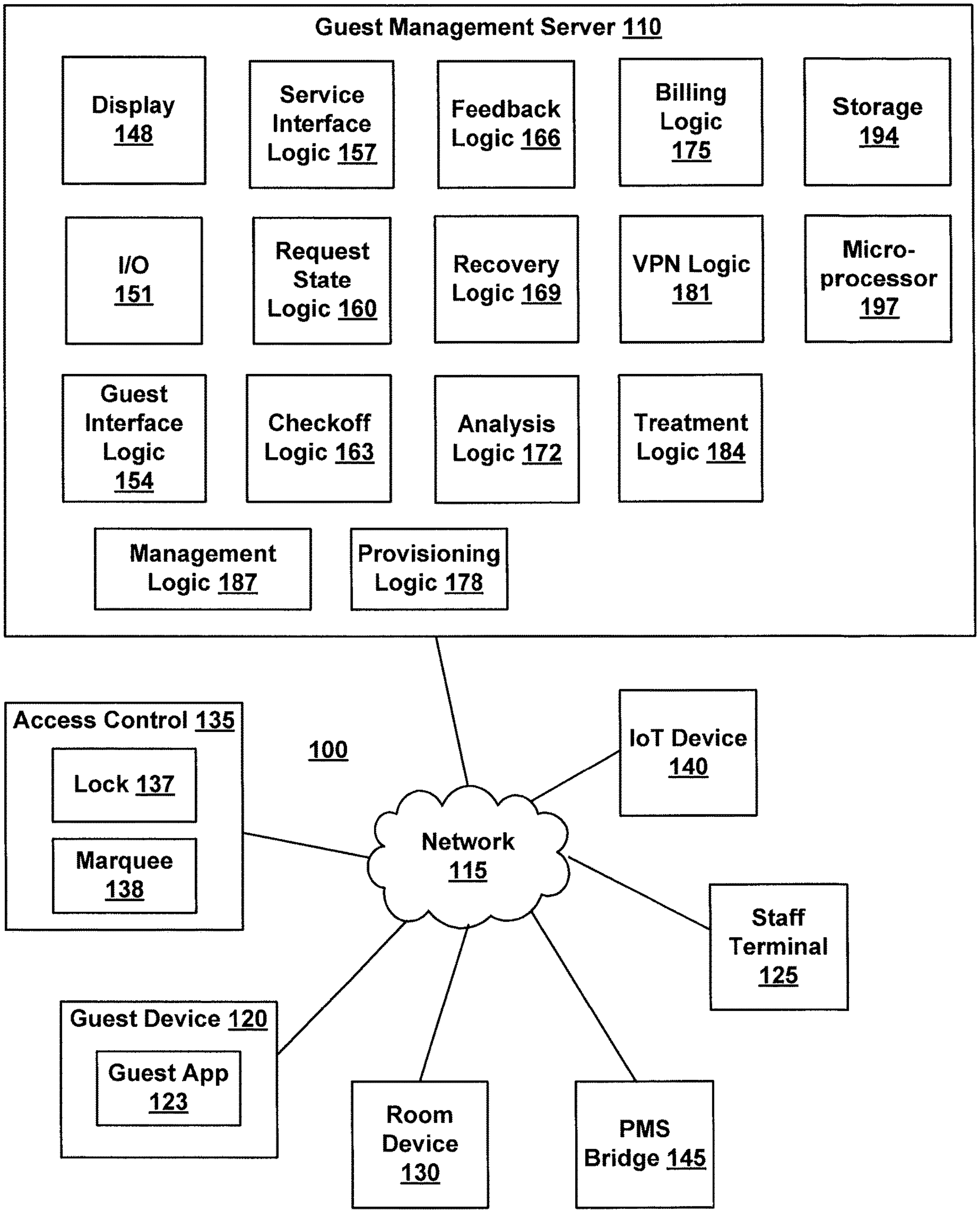
FIG. 1 illustrates a guest management system, according to various embodiments of the invention.

FIG. 1 illustrates a Guest Management System 100, according to various embodiments of the invention. As noted elsewhere herein, Guest Management System 100 may be used in a wide variety of applications in which a guest makes use of services and/or facilities. The use of Guest Management System 100 has been found to improve quality, cost and understanding of services provided.

Guest Management System 100 includes a Guest Management Server 110 connected via a Network 115 to a variety of devices. Guest Management Server 110 can comprise a variety of hardware and logic modules configured to enable specific functions of the invention, as described elsewhere herein. Guest Management Server 110 can include one or more computing devices, which are optionally geographically distributed. As used herein, the term logic is meant to mean "hardware, firmware, and/or software stored on a non-transient computer readable medium." The logic may be configured (through the selection of appropriate computing instructions) to produce a specialty computing device from a general purpose computing device.

Network 115 is configured to communicate messages in a digital format, for example, using IP/TCP protocols. Network 115 can include a local area network, a wide area network, a private network, a wireless network, a cellular network, and/or the internet. For example, in some embodiments, Network 115 includes an internet connection between Guest Management Server 110 and a cellular communications provider, and a wireless connection between a cellular transceiver and a mobile device.

The devices that Guest Management Server 110 may be connected to via Network 115 include a Guest Device 120, a Staff Terminal 125, and/or a Room Device 130. Optional Guest Device 120 is a computing device of a guest, meaning that it is a device controlled by and typically in the possession of a guest. Examples of Guest Device 120 include a guest's smartphone, table computer or wearable device. Guest Device 120 may be brought by a guest to multiple different facilities managed by different implementations of Guest Management System 100. In some embodiments, Guest Device 120 includes an application and/or other logic specifically configured to communicate with other elements of Guest Management System 100. For example, Guest Device 120 may include logic for communicating with a Lock 137 of Access Control 135 as taught in U.S. patent application Ser. No. 15/483,932. Guest Device 120 is optionally configured to communicate via a display screen and/or wireless connection.

Staff Terminal 125 includes one or more communication devices configured to be used by facility staff, e.g., "service providers." Staff Terminal 125 can include a stationary computing device such as a personal computer or a data entry terminal. Staff Terminal 125 can further include a mobile device such as cellular phone or mobile computing device configured to be carried by a staff member. Such mobile devices may be provisioned with applications specifically configured for communicating with Guest Management Server 110. In some embodiments, a Room Device 130 or a Marquee 138 may have operational modes in which they are configured to be accessed by a staff member, and as such, to operate as a Staff Terminal 125. Instances of Staff Terminal 125 optionally include circuits configured to determine their location within a facility. For example, Staff Terminal 125 may include a GPS or local positioning system. A local positioning system can include active or passive RFID, multiple wireless transmitters, barcode readers, and/or the like.

Optional Room Device 130 is a communication device associated with a specific room and/or location. Room Device 130 is optionally portable. For example, Room Device 130 can include a table computer assigned to a specific hotel room. As is discussed further elsewhere herein, Room Device 130 is optionally configured for a user to communicate with Guest Management Server 110, to control IoT Device 140, to control Access Control 135, and/or to provide content to a guest. The content can include service menus, entertainment/news, internet access, communications (e.g., VoIP), service status reports, invoices, and/or the like.

Room Device 130 optionally include a wireless transmitter and GPS (or local positioning) circuits. These features allow Room Device 130 to communicate with Guest Management Server 110 as Room Device 130 is moved around a facility. Further, the operation of Room Device 130 is optionally dependent on a location of Room Device 130. For example, Room Device 130 may only be able to control a television within the room that Room Device 130 is associated, while Room Device 130 is in that room. Room Device 130 may only be configured to complete a purchase from a shop, while located in the shop. Menus presented on Room Device 130, including those offering products and services, may be location and/or time dependent. For example, a jet ski ride may be offered by on a beach by day but not in a dining room at night. In some embodiments, Room Device 130 is configured to significantly disable functions if moved more than a predetermined distance from a facility. For example, if moved more than a mile from a hotel, Room Device 130 may be configured to only display a message requesting return to a hotel and to have no other functionality. In addition any data personal to a guest or provisioned to Room Device 130 of the guest may be wiped from Room Device 130 if not returned to the hotel in a specific time. Such features are configured to discourage theft of Room Device 130. Some instance of Guest Management Server 110 are configured to automatically debit an account (e.g., charge a credit card) if a Room Device 130 is removed from a facility.

Staff Terminal 125 and Room Device 130 typically include security features configured to control access to these devices. For example, they may require login credentials, such as a personal identification number, biometric scan, login name, and/or password. In some embodiments, access to Room Device 130 by a guest initially requires that the guest provide authentication credentials sent to or generated on Guest Device 120.

Guest Management Server 110 may further be connected to, via Network 115, an Access Control 135, an IoT Device 140, and/or a PMS Bridge 145. Access Control 135 includes devices that control physical access to part of a facility, e.g., a room, specific parts of a building, a vehicle, and/or the like. For example, Access Control 135 may be configured to control a door to a guest's room, a VIP lounge, a wet bar, an in-room safe, a facility floor (e.g. via elevator), a gym, a club, and/or the like. Access Control 135 includes a locking mechanism (e.g., Lock 137) and optional Marquee 138. Marquee 138 may be used to control the locking mechanism via, for example, Guest Device 120 or Staff Terminal 125. Access Control 135 optionally further includes logic configured to generate randomized key pairs for use in providing encrypted control of Access Control 135. In various embodiments, Guest Device 120 and/or Room Device 130 are configured to lock and unlock Lock 137 via Access Control 135. Guest Device 120 and/or Room Device 130 are optionally configured to receive video from Marquee 138, so as to function as a wireless peephole through which a guest can view an area outside their hotel room door or at an apartment lobby, etc.

In a specific example, Access Control 135 and Lock 137 are included in an elevator control system. Lock 137 controls which floor buttons can be activated and, thus, to which floors a guest can send the elevator. If the 15$^{th}$ floor has limited access, then Access Control 135 is configured to only allow access to those guests (and their designated visitors) staying on the 15$^{th}$ floor.

In some embodiments, a guest can temporally grant a visitor access by sending appropriate certificates/codes to the visitor's mobile device. This access may be limited to a specific time period. For example, a housekeeper at an apartment complex managed using Guest Management Server 110 may be given access credentials that permit access between 3:30 and 4:30 every other Tuesday. Likewise, attendees to a business meeting may be provided access credentials that permit access only during a time period shortly before the scheduled meeting.

Optional IoT Device 140 includes one or more network accessible devices such as a thermostat, a security safe, entertainment system (e.g., music player, television system, etc.), lighting system, appliance, and/or the like. IoT Device 140 may be connected to Network 115 by a wired or wireless connection. In one example, IoT Device 140 includes an entertainment system including a display, sound system and connection to a source of content, such as the internet, cable TV service or Satellite. In various embodiments, Guest Device 120 and/or Room Device 130 are configured to function as a remote control for an entertainment system, thermostat, lighting, an appliance, etc.

Optional PMS Bridge 145 includes a communication bridge to a "property management system" such as may be used in many facilities to manage reservations and the like. Two-way communication between the property management system and Guest Management Server 110 can include reservation dates, guest identity information, billing information, room availability, and/or the like. In alternative embodiments, Guest Management Server 110 is further configured to perform one or more functions of a property management system, such as receiving and managing reservations. In various embodiments, Guest Device 120 and/or Room Device 130 are configured for making or changing reservations.

In some embodiments, PMS Bridge 145 is configured to receive reservation data and to configure other elements of Guest Management System 100 accordingly. For example, as discussed further herein, in response to a reservation Guest Management server 110 can be configured to provision Access Control 135, Guest Device 120, Room Device 130, and/or IoT Device 140 according to characteristics of the reservation.

As illustrated in FIG. 1, Guest Management Server 110 optionally includes a Display 148. Display 148 can be a computer monitor, terminal, and/or the like. Typically Display 148 is configured to display information regarding the status and operation of Guest Management Server 110 and/or other elements of Guest Management System 100. In various embodiments, Display 148 may be used to present reports on the performance of service requests, pending service requests, performance of service providers, etc. Display 148 is optionally further configured for a user to enter commands to control operation of Guest Management System 100.

Guest Management Server 110 further includes an I/O 151 configured for sending and receiving data. For example, I/O 151 may include a router, firewall, Ethernet port, wireless transceiver, and/or the like, configured for communicating with Network 115. I/O 151 may further include a touchscreen, keyboard, pointing device, etc.

Guest Management Server 110 further includes a Guest Interface Logic 154. Guest Interface Logic 154 is configured for communicating between Guest Management Server 110 and a guest. The guest may engage in these communications via Guest Device 120, Room Device 130, Marquee 138, and/or IoT Device 140. Specifically, Guest Interface Logic 154 is configured to provide menus of available services to a guest and to receive services requests from the guest in response to these menus. In one illustrative example, a guest uses Room Device 130 to access a menu of food and drink items available from room service, selects desired items from the menu, and request deliver to the guest's room. In another example, Guest Device 120 is used to access a menu (generated by Guest Interface Logic 154) from which the guest can select delivery of towels, drinks and a massage to a location by a pool.

The menus generated by Guest Interface Logic 154 may be dependent on a wide range of factors. These factors include characteristics of the guest, characteristics of a reservation, characteristics of a facility, and/or the like. Characteristics of the guest can include the identity of the guest, VIP status of the guest, a history of service requests made by the guest, amounts the guest spends, estimated income of the guest, age of the guest, dietary needs of the guest, gender of the guest, hometown of the guest, and/or other characteristics personal to the guest. Such characteristics are typically stored in a guest profile, for example in a Storage 194. In some embodiments, Guest Interface Logic 154 is configured to present a guest with food service menus that takes into consideration dietary and/or religious needs. The guest profile may include a history of guest activity that spans multiple reservations at multiple facilities. For example, the guest's history of service requests may include requests for service made at multiple facilities (optionally owned/managed by different entities), under different reservations, over an extended period of time. Further, a guest's history may indicate that they prefer to have a drink before bed and almost always request additional towels. This history may include drinks and towels requested at different hotels over several years. A guest's profile is thus, optionally, portable between facilities and instances of Guest Management Server 110. In a specific example, Guest Interface Logic 154 is configured to include a guest's favorite food and drinks in a food service menu.

Characteristics of a reservation, which may be used by Guest Interface Logic 154 to customize a menu, can include an amount paid for the current reservation, how many people are included in the reservation, whether the reservation is part of a tour group or conference, purpose of the reservation (e.g., business, pleasure, medical, etc.), length of the reservation, room type reserved by the guest, and/or the like. For example, a guest that pays more for a room may be offered a greater range of services relative to a guest that pays less. A guest that is with their family may be offered more services that include family activities, relative to a guest who is alone. For example, such a guest may be offered tickets to a local amusement park or family tour. A guest that is part of a group may receive a menu that includes services specific to the group. For example, a dinner reservation for several group members, or an invitation to a group event. Guest Interface Logic 154 is optionally configured to communicate messages between members of a group. A guest that is at the facility for pleasure may receive a menu that includes more recreational activities relative to a guest visiting for business.

A guest that is at the facility for medical services, e.g. a patient visiting a hospital, may receive a menu that is appropriate for their dietary needs and the services they are to receive. In addition, a patient at a hospital may also receive menu items appropriate for visitors to the patient. For example, a patient that is from out of town who is expected to be at the hospital for several days may have family visiting. In this case, Guest Interface Logic 154 may be configured to provide menus that include activities and/or entertainment directed at the family. Further, Guest Interface Logic 154 may be configured to provide information to an instance of Guest Device 120 in the possession of a family member, the information including status updates regarding the patient, religious counseling, content designed for emotional support, etc.

Characteristics of a facility include, for example, the type of facility, e.g., a large resort, a cruise ship, a small hotel, a campground, an apartment building, a hospital, a hospice, an aircraft, an amusement park, etc. Guest Interface Logic 154 is configured to provide different menus to a guest based on the type of facility. Further, the menus provided may vary in real-time dependent on range of services what services are available at particular places and times. For example, if a massage service if fully booked for the next 48 hours, then this service may not be offered as an immediate option. Likewise, if a massage service is under booked, then Guest Interface Logic 154 may offer a massage service at a premium location on a menu. Thus, the presence and/or position of a service in a menu, as provided by Guest Interface Logic 154 can be dependent on current demand for and/or availability of the service.

Guest Interface Logic 154 is optionally configured to present services to be provided by third parties. Thus, a menu provided to a guest can include promotions and/or offerings from businesses external to a facility. For example, a menu may include and advertisement for a local amusement park, for a car rental/transportation service, for a local restaurant, and/or the like.

Guest Interface Logic 154 is optionally configured to include promotions (e.g., advertisements) within a menu. The selection and placements of promotions can also be dependent on the characteristics of a guest, characteristics of a facility, and/or characteristics of a reservation. In some embodiments, promotions and other menu items are dependent on how well service was provided to a guest in the past.

As is further discussed elsewhere herein, the quality of past service may be based on a "score" of a service provision effort.

Guest Management Server 110 further includes a Service Interface Logic 157. Service Interface Logic 157 is configured for communicating between Guest Management Server 110 and Staff Terminals 125. This communication includes notices of service requests received via Guest Interface Logic 154. For example, Service Interface Logic 157 may be configured to notify a housekeeping department that a guest has requested a toothbrush be delivered to their room, to notify a food service department that a guest has requested that food be delivered to their room, to notify housekeeping that a guest has checked out or left the facility, and/or the like.

In some embodiments, Service Interface Logic 157 is configured to communicate with third parties. For example, Service Interface Logic 157 can be configured to communicate with a browser or application on a remote third party's computing device. The third party may be an entertainment facility, restaurant, shopping service, rental service, transportation service, or any other external service provider that a guest may need. In a more specific example, Service Interface Logic 157 is configured to communicate to a plurality of local restaurants and to a delivery service. A guest may view menus from these restaurants and order items for delivery to their room. Service Interface Logic 157 is configured to communicate these orders to the restaurants and to receive a notice from the restaurants when the orders are ready for pickup.

In some embodiments, Service Interface Logic 157 is configured to assign a service request to a specific service provider. This assignment may be based on, for example, location of the service provider, skills of the service provider, current tasks assigned to the service provider, experience of the service provider with a particular guest, work hours of the service provider, location the service is to be provided, and/or the like. In a specific example, as guests are detected leaving a facility, the detection being based on a reported location of Guest Device 120, housekeeping staff may be assigned to clean the guest's respective rooms. A particular service provider may be assigned rooms in a particular section or floor of the facility.

Service Interface Logic 157 is optionally further configured to received updates from service providers regarding the provision of a requested service. For example, kitchen staff may use Service Interface Logic 157 to indicate that a meal is ready to be delivered to a guest. Further, Service Interface Logic 157 may be used to indicate that a service is currently unavailable and that this unavailability should be considered as menus are generated by Guest Interface Logic 154. In one example, if all personal trainers are reserved until 3:00 PM, then only options for reserving trainers after 3:00 PM are included in provided menus. In another example, if Service Interface Logic 157 is used by kitchen staff to indicate that a particular dessert is no longer available, this dessert is automatically removed from menus provided by Guest Interface Logic 154.

Guest Management Server 110 further includes a Request State Logic 160. Request State Logic 160 is configured to track a progress state of a service request. The progress state is based on a workflow associated with the service request and status information received from service providers via Service Interface Logic 157. The workflow is typically predefined by management and can include, for example, a sequence of materials and steps required to complete a service request. For example, delivery of a meal to a room may include i) preparation of the meal, ii) placement of the meal on a delivery cart for a specific floor, iii) movement of the cart to the floor, and iv) delivery of the meal to a guest's room. Each of these steps may be part of a workflow and may be tracked using Request State Logic 160.

Guest Management Server 110 optionally includes Checkoff Logic 163. Checkoff Logic 163 configured to receive an acknowledgement that the service request is completed, i.e., fulfilled. The completion of a service request may be acknowledged by a guest receiving the service and/or a service provider that completes the service request. For example, a guest may acknowledge receipt of an expensive bottle of champagne. In a more specific example, when an item is delivered to a guest, the guest may be requested to acknowledge receipt by signing a touch screen on a Staff Terminal 125 of the service provider that delivered the item. Such an exchange can include confirmation of a fee and optional tip. The functionality of Checkoff Logic 163 is alternatively included as part of Service Interface Logic 157. Completion of a service request is used by Request State Logic 160 to log the request as being completed. The logged information optionally includes identities of the service providers involved in completing the request, the identity of the guest that made the request, times taken to complete each step in the request, financial value of the request, account billing information, resulting inventory adjustment, and/or any other information relating to the service request and its completion.

Guest Management Server 110 optionally further includes Feedback Logic 166. Feedback Logic 166 is configured for a guest to provide feedback on the completion of a service request. For example, in response to delivery of a meal to a guest, Feedback Logic 166 may send a message to Guest Device 120, Room Device 130 and/or IoT Device 140 asking if the meal was satisfactory and/or for the guest to rate the service provided. This message may be timed for delivery shortly have the request is logged as having been completed and/or after a time sufficient for the meal to be eaten. Depending on the type of service provided, Feedback Logic 166 may merely request a rating (e.g. 1-5 stars), or may request textual or verbal input from the guest. A low rating may result in a request for further details and/or an explanation. The feedback received by Feedback Logic 166 is optionally stored with the log of the service request.

Guest Management Server 110 optionally further includes Recovery Logic 169. Recover Logic 169 is configured to perform steps to recover from undesirable feedback received via Feedback Logic 166. These steps are optionally performed automatically. Recover Logic 169 may further be responsive to a score for the provision of the requested service as determined by Analysis Logic 172, as discussed elsewhere herein. The steps taken by Recovery Logic 169 are typically selected to compensate for a guest's dissatisfaction regarding the provided service. For example, a guest that is dissatisfied with a meal may receive a discount on a subsequent meal or some other service. In some cases, Recovery Logic 169 is configured to notify a service provider, quality manager, facility manager, or other management to pay a visit to a guest and personally discuss the guest's dissatisfaction and provide remediation.

Recovery Logic 169 is typically configured to provide compensation in proportion to the reasons for the guest's dissatisfaction. For example, a piece of glass in a salad may result in a greater amount of compensation than a overcooked egg. Further, Recovery Logic 169 may be configured for adjusting compensation based on a guest's profile. For example, a guest that is consistently unsatisfied with provided services may be offered reduced compensation on the grounds that compensation does not appear to make a difference in the guest's satisfaction.

Guest Management Server 110 optionally further includes Billing Logic 172. Billing Logic 172 is configured for managing the billing of provides services to a guest's account. Billing Logic 172 is optionally configured to receive confirmation that a service request has been completed before charging the service against a guest's account. In some embodiments, Billing Logic 172 is configured to charge for completed service requests to a single guest's account, even when the service requests are made from different Guest Devices 120. For example, of a reservation includes a family, several members of the family may have smartphones that can be configured as Guest Device 120. Billing Logic 172 may be configured for the guest making the reservation to designate which services particular family members may or may not request, to designate limits on the costs of services requested by family members, to designate, classes of services specific family members may request, and/or the like. In some embodiments, Billing Logic 172 is configured for one family member (e.g. a parent that made the reservation) to approve service requests by other family members. Billing Logic 172 is optionally configured to receive a credit from Recovery Logic 169 in an attempt to recover from a poorly provided services.

Guest Management Server 110 optionally further includes Analysis Logic 172. Analysis Logic 172 is configured to analyze the completion of one or more service requests and determine how well these services requests are being provided. The analysis can include calculation of statistics bases on logs of completed services. The statistics can include averages, means, ratiodeviations, probabilities, and/or the like. In some embodiments, the statistics are based on data logged by Request State Logic 160. For example, the statistics can be based on actual performance metrics of service providers as noted by Request State Logic 160. Specifically, the statistics may be based on measured delivery times room service or for delivery of food from third parties. The statistics may be generated with respect to specific classes of services (e.g., room service, housekeeping, bar service, transportation, third party service, etc.) The statistics may also be generated with respect to specific guests or classes of guests. For example, statistics representing all service requests made by a particular guest or group of guests may be generated by Analysis Logic 172. The statistics may be generated with respect to a particular location, e.g., a particular floor of a hotel or a particular department in a hospital. The statistics may further be based on service requests that were never completed.

In some embodiments, Analysis Logic 172 is configured to generate scores representative of the quality of provided services. These scores may be based on guest feedback received via Feedback Logic 166, statistics generated by Analysis Logic 172 and/or logs of provided services. The scores may be with respect to a specific service request for a specific guest, service classes, specific guests, classes of guests, groups of guests, a location, a specific facility, and/or the like. Scores are optionally calculated using a linear equation and a set of weighted coefficients. In one example, 50% of a is based on guest feedback and 50% of the score is based on objective criteria measured by Request State Logic 160. The objective criteria are optionally further weighted by circumstances. For example, a time of 15 minutes to deliver towels to a room may be considered a satisfactory time when a lower number of service providers are on duty but a less satisfactory time when a relatively higher number service providers are on duty. Calculated scores may be assigned to a specific service provider, a department, a service team, a facility, and/or the like. Assigned scores are stored and optionally kept as part of business records for the purpose of performance reviews and/or the like. Compensation and/or promotion of employees may be based on scores calculated using Analysis Logic 172. Different weightings are optionally used when calculating a score assigned to an individual service provider relative to a score assigned to a department or facility, etc.

The analysis made by Analysis Logic 172 may further include comparison of calculated performance criteria, e.g., scores, between facilities of similar type. For example, Analysis Logic 172 may be configured to compare calculated performance criteria between cruise ships of the same class, between high end resorts and/or between roadside hotels. Such comparison may be used to improve financial performance and/or detect opportunities of a facility.

In some embodiments, Analysis Logic 172 is configured to generate scores representing a quality/performance of services provided by third parties. For example, a score may represent the quality of food and promptness of delivery by a third party. The third party is optionally compensated based on the generated score. Further, third parties may receive a public rating based on their scores for providing services to a particular facility.

Guest Management Server 110 optionally further includes Billing Logic 175. Billing Logic 175 is configured to add fees to a guest's account based on the completion of service requests by service providers. In some embodiments, Billing Logic 175 is configured to parse logs of completed services requests generated by Request State Logic 160. Further Billing Logic 175 is optionally configured to adjust fees for completed services responsive to scores for those services. For example, a guest may receive a discount for a service with a relatively low score as directed by Recovery Logic 169. The fees may be for the provision of a service and/or a product that is part of the service.

Billing Logic 175 is optionally configured to monitor gambling activities of a guest. For example, if IoT Device 140 includes a slot machine, Billing Logic 175 is optionally configured to debit losses or credit winnings to a guest's casino account. Billing Logic 175 is optionally configured to bill a guest's credit card.

Guest Management Server 110 optionally further includes Provisioning Logic 178. Provisioning Logic 178 is configured to provision various elements of Guest Management System 100. As used herein, the term provisioning is meant to include loading of software to a device and/or configuration of settings thereon. Provisioning may also include providing security information such as encryption & decryption keys, passwords, biometric data, and/or personal identification numbers. In an illustrative example, Guest Device 120 may be provisioned by providing Guest App 123 to Guest Device 120 and setting default parameters for the execution of Guest App 123. In some embodiments, room or door codes are provisioned to Guest Device 120, the code being configured to control Lock 137 via Marquee 138. As used herein a door code is a code configured for operation of Access Control 135, e.g., to unlock a door. A room code is a code configured for operation of objects associate with a room. A lock code is an example of a room code. A room codes and door codes can include personal identification number, digital keys, certificates, passwords, biometrics, and/or the like. For example, in some embodiments a room code includes fingerprint data configured to be compared with a guests detected fingerprint as scanned using Access Control 135. In some embodiments a room/lock code includes a digital certificate provisioned to Guest App 123.

Provisioning of different devices may occur at different times. For example, Guest Device 120 may be provisioned in response to making of a reservation. Access Control 135 may be provisioned in response to checkout of a prior guest. Room Device 130 and IoT Device 140 may be provisioned when a guest arrives at a facility and/or checks in for a stay. Note that in some embodiments, Guest Interface Logic 154 and Guest App 123 are configured to automatically check a guest into a facility once Guest Device 120 is detected (e.g., via GPS) to be present at or near the facility. Guest Interface Logic 154 is optionally configured to provide the guest (via Guest App 123) their room number or an estimated time of room availability, when Guest Device 120 is detected to be in the vicinity of the facility. For example, if the facility is a hotel, Guest App 123 may be configured to detect via GPS that Guest Device 120 is within 3 miles of the hotel on an expected check-in day for a reservation. In response to this event, Guest App 123 may communicate to Provisioning Logic 178 to request room and key codes. These codes are provided to Guest Device 120, if the proper credentials are included in the request, and the guest is notified that they have been automatically checked in for their stay. Guest App 123 is configured to use the room/door codes to control Access Control 135 and/or other elements of Guest Management System 100.

Provisioning Logic 178 is optionally configured to provision Guest Device 120, Room Device 130, and/or IoT Device 140 base on characteristics of the guest. For example, Provisioning Logic 178 may be configured to retrieve characteristics of a guest from their stored guest profile and to provision these devices using the retrieved characteristics. The stored characteristics can include a history of services consumed by the guest, personal account access information for third party accounts, content owned or used by the guest, applications used by the guest, and/or the like. The guest profile may include information that is not tied to a particular facility, information gathered from multiple facilities, and/or information entered by the guest.

In an illustrative example, Provisioning Logic 178 is configured to retrieve third party account data from a user profile. This third party account data can include login data to a Skype, Facebook, Netflix or Amazon account, video on demand account, digital magazine subscription, a digital newspaper subscription, a mobile desktop, an e-mail account, e-book account, and/or the like. Using this data Provisioning Logic 178 can establish connections to these various services from Room Device 130 and/or IoT Device 140. Specifically, Room Device 130 may be configured to automatically be logged into a guest's Netflix account such that the guest can watch movies on the device without having to take the trouble to enter all the login data for each of their accounts at each facility they visit. As a result of Provisioning Logic 178, a guest can arrive at their room. Unlock their door using their smartphone (Guest Device 120), pick up the in-room tablet computer (Room Device 130) and immediately be reading their personal subscription to the Wall Street Journal on the table computer. In another example, by provisioning IoT Device 140 with a guest's Skype login data a VoIP phone can automatically be setup to use a guest's account and contact information. An in-room entertainment system may automatically be configured to access a guest's premium movie or sports package.

As noted elsewhere herein, Guest Interface Logic 154 is optionally configured to present customized service menus to guests, some of these menus are may be provided to Guest Device 120, Room Device 130 and/or IoT Device 140 as part of an initial provisioning of these devices when the guest checks in or arrives at a facility. In some embodiments, Provisioning Logic 178 is configured to set access control to the elements of Guest Management Server 100 to a predetermined personal identification number or passcode associated with the guest. For example, a guest may have a personal identification number (PIN) that they like to use. By provisioning devices to accept this PIN at check-in, the guest can use the same PIN at multiple facilities. Typically, the guest can set the preferred PIN using Guest Interface Logic 154.

Provisioning Logic 178 is optionally configured to provision third party applications on Room Device 130 or IoT Device 140. For example, if a guest is a devotee of the World of Warcraft video game, the client-side application for this game may be automatically provisioned on IoT Device 140 before or at the time a guest checks in. The provisioned application can include the guest's login credentials, configuration setting, add-ons, and/or other information associated with the guest. Other examples of third party applications that can be provisioned include, work related applications (e.g., Office365®), image editing software, a remote desktop, and/or the like.

Provisioning Logic 178 is optionally configured to provision multiple instances of Guest Device 120 in associating with a single reservation or event. For example, an application configured for use at a technical conference may be provisioned (with guests' approval) on the Guest Device 120 of each the conference attendees. When a reservation is associated with a family, tour or other small group, Provisioning Logic 178 optionally provisions Guest Devices 120, Room Devices 130, and/or IoT Devices 140 dependent on characteristics of each guest. For example, a child may receive different entertainment content and privileges relative to an adult in the same family.

Provisioning Logic 178 is optionally configured to wipe personal data and/or information from elements of Guest Management System 100. This may occur, for example, when a guest checks out or when Room Device 130 is removed from a facility. The removal of personal data and/or information can include removal of content provisioned by Provisioning Logic 178, including a guest's personal login credentials. In some embodiments, data and instructions on Room Device 130 and/or IoT Device 140 are automatically removed between reservations (i.e., between guests). For example, a guest's login credentials and browsing history may be automatically removed from Room Device 130 when the guest checks out. When Room Device 130 is removed from a facility, wireless connection between Guest Management Server 110 and Room Device 130 may be lost. A component of Provisioning Logic 178 is optionally included on Room Device 130 such that the data and information may be wiped even without contact to Guest Management Server 110.

In some embodiments, Provisioning Logic 178 and/or Access Control 135 are configured to control use of Lock 137 by service providers. For example, a service provider using Staff Terminal 125 may only be allowed access to a room if the service provider is delivering or performing a service in that room. This may be accomplished using Provisioning Logic 178 by provisioning access keys to Staff Terminal 125 when the service provider is assigned a specific service related to the room. These access keys are optionally for one-time use and may be secured with Staff Terminal 125. Alternatively, access to a room can be controlled by modifying Access Control 135 to accept a personal passcode of the service provider, when the service request is assigned to the service provider. With either approach, only those service providers that are authorized may control Lock 137.

Guest Management Server 110 optionally further includes VPN Logic 181. VPN Logic is configured to facilitate establishment of personal Virtual Private Networks (VPN) on behalf of guests. For example, when a guest checks in or arrives at their room, VPN Logic 181 can automatically create a VPN including Guest Device 120, Room Device 130, and/or IoT Device 140. Creation of the VPN includes configuring each of the member devices with a specific network identifier and passcode. The VPN optionally also includes elements of Guest Management Sever 110, e.g., I/O 151 and Guest Interface Logic 154.

Creation of a VPN results in secure connections between the member devices and greatly enhances security of communications between these devices. Data communicated within the VPN is encrypted and secure. Further, browsing performed from Guest Device 120, Room Device 130 or IoT Device 140 is made difficult to track.

Guest Management Server 110 optionally further includes Treatment Logic 184. Treatment Logic 184 is most commonly found in embodiments in which Guest Management Serve 110 is used to provide services to guests at a medical facility, such as a hospital. Treatment Logic 184 is configured for considering medical conditions and treatments into account during the operation of other elements of Guest Management System 100. For example, Treatment Logic 184 may be configured to prevent Guest Interface Logic 154 from offering food service to a guest that is about to undergo surgery or to offer a menu of food items that conform to a medically recommended diet. To do this, Treatment Logic 184 is optionally configured to directly access the guest's medical records and to communicate restrictions/recommendations to Guest Interface Logic 154 based on these records.

In a medical setting, a "guest" may include a patient as well as the patient's visitors (e.g., family and friends). Thus, instances of Guest Device 120 may belong to the patient as well as registered family members. Some services may be provided to visitors but not provided to a patient. For example, tickets to a local amusement park may be provided to a patient's family but not to the patient. Treatment Logic 184 is optionally configured for communicating medical information to family members. For example, status of a patient's treatment may be communicated to Guest Devices 120 of persons selected by the patent.

Guest Management Server 110 optionally further includes Management Logic 187. Management Logic 187 is configured to manage various aspects of Guest Management System 100. For example, Management Logic 187 may be configured to establish workflow for the completion of service requests, to set criteria for third party service providers, to select compensation to a guest for unsatisfactory service, to designate service providers (e.g., schedule shifts, assign Staff Terminals 125, assign responsibilities, and/or the like), to determine which Guest Device 120, Room Device 130, and/or IoT Device 140 can make charges to a guest's financial account, and/or the like.

In some embodiments, Management Logic 187 is configured to set criteria for automatic check-in and checkout of a guest based on activity/location of Guest Device 120. For example, Management Logic 187 may be configured to specify that a guest should automatically be checked in when Guest Device 120 comes within ½ mile of a facility. Management Logic 187 may also be configured to automatically lock guest use of Room Device 130 and IoT Device 140 one hour after a guest's checkout time.

Guest Management Server 110 further includes Storage 194. Storage 194 includes digital storage such as volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information. Storage 194 optionally includes data structures, e.g., a database, having data records specifically configured to store data related to the operation of Guest Management System 100. The data stored in Storage 194 can include guest profiles, service request logs, assigned scores, menus, service request states, analysis results, service provider profiles, guest account data, billing information, VPN configuration data, medical information, and/or the like. Storage 194 may also be configured to store applications such as Guest App 123 and/or other logic provisioned by Provisioning Logic 178.

Guest Management Server 110 further includes Microprocessor 197. Microprocessor 197 is a digital processor configured to execute Guest Interface Logic 154, Service Interface Logic 157, Request State Logic 160, Checkoff Logic 163, Feedback Logic 166, Recovery Logic 169, Analysis Logic 173, Billing Logic 175, VPN Logic 181, and/or Treatment Logic 184. Microprocessor 197 may include several electronic devices.

Figure 2:
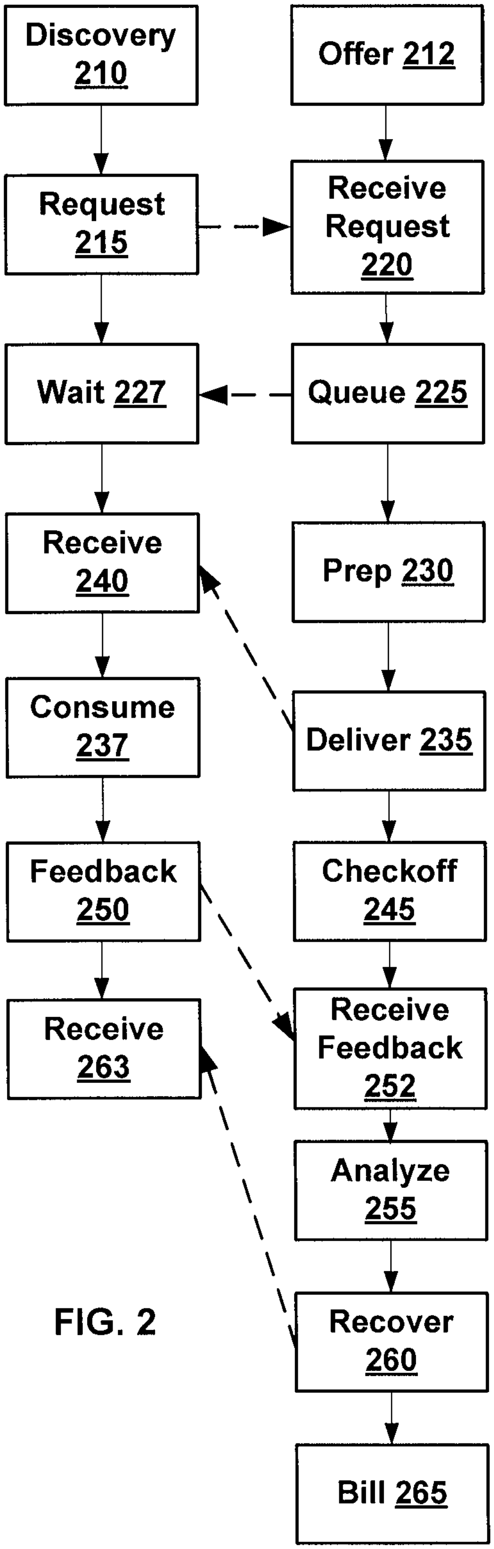
FIG. 2 illustrates methods of providing services to a guest, according to various embodiments of the invention.

FIG. 2 illustrates methods of providing services to a guest, according to various embodiments of the invention. In this method a guest receives a menu of services, selects and then receives one of the services. The quality of the service may be determined using either or both feedback from the guest and an objective analysis of data within a log of the provision of the service. If the service is determined to be poor, e.g., below a required standard, then a recovery may be automatically initiated. Preferably the recovery is initiated a short time after the service is provided such that the guest feels properly compensated.

FIG. 2 illustrates steps performed by both the guest and by Guest Management System 100 (and associated service providers). Those steps performed by Guest Management System 100 are discussed first below. These steps are performed in parallel with steps performed by the guest, which are discussed further below.

In an Offer Step 212 a menu is provided to a guest via Guest Device 120, Room Device 130 or IoT Device 140. The menu is optionally generated and provided using Guest Interface Logic 154. As noted herein, the menu can be customized based on a wide variety of factors including available services, a guest profile, location of Guest Device 120, etc. The menu may be offered via Guest Device 120, Room Device 130, Marquee 138, and/or IoT Device 140. The menu may further include promotions, coupons, advertisements, and/or the like. The menu includes offers for services, including providing products, which may be accepted/requested by a guest. Menus sent in Offer Step 212 may be sent via a browser interface, an application interface, and/or via text message.

In a Receive Request Step 220 a service request is received at Guest Management Server 110, typically via I/O 151 and Guest Interface Logic 154. The service request is typically based on a selection from the menu provided in Offer Step 212. The service request may include information provided by the guest, e.g., hamburger should be "well-done," and/or a location/identifier of the device from which the request is received. The request can include an identity of the requestor. For example, if a reservation is for a family of four people, the request may indicate which family member made the request and which of several Guest Devices 120 associated with the reservation the request was made from.

In a Queue Step 225 the received service request is placed in a queue. This queue is optionally maintained in Storage 194. Queue Sep 225 optionally includes assigned the service request to one or more specific service providers. Queue Step 225 is optionally performed by Request State Logic 160. The queue may be specific to a particular service provider or to a service provider team. For example, a queue may be maintained for a housekeeping team in a particular part of a facility.

In a Prep Step 230 any materials required to complete the service request are prepared. For example, a meal may be prepared or towels may be placed on a delivery cart. Prep Step 230 is optionally performed using Service Interface Logic 157. Prep Sep 230 may include a plurality of individual steps, each of which is logged using Request State Logic 160. Further, different preparation steps may be assigned to different service providers in Queue Step 225.

In a Deliver Step 235 the requested service is provided to a guest, typically the guest that requested the service. Deliver Step 235 may be performed by a human service provider or may be provided electronically, as monitored by Request State Logic 160. For example, a human service provider may deliver a product to a guest, or digital entertainment may be provided to the guest via Guest Device 120, Room Device 130, and/or IoT Device 140.

In an optional Checkoff Step 245 completion of the service request is confirmed. Checkoff Step 245 may be performed using Checkoff Logic 163. In some embodiments, Checkoff Step 245 is performed by a service provider using Staff Terminal 125 or Marquee 138. For example, after making up a bed, the service provider may use Marquee 138 to confirm that the task has been completed. The confirmation is noted by Request State Logic 160 as a completion of the customer service request.

In a Receive Feedback Step 252 feedback regarding the request is received. The feedback may be from the guest that requested the service, or may be automatically generated by Analysis Logic 172 based on a log of the completion of the service request. For example, the guest may rate the completion of the service poorly or the log may show that the completion of the request took an unusually long time. The feedback can include a rating and/or comments provided by the guest.

In some embodiments, Guest Interface Logic 154 is configured to request feedback from the guest. For example, Guest Interface Logic 154 may be configured to provide a menu that includes an option to rate a specific service on a 5 star scale. Receive Feedback Step 252 is optionally performed using Feedback Logic 166.

In an optional Analyze Step 255 the completion of the service is analyzed using Analysis Logic 172. In Analyze Step 255 the quality of the provided service is analyzed to determine if the service was satisfactorily provided. The analysis may be based on feedback received in Receive Feedback Step 252 and/or based on objective analysis of a log of the provision of the service. For example, a two out of five star rating in a guest's feedback may be considered unsatisfactory. Likewise, a delivery time that is twice a mean delivery time may be considered unsatisfactory. As noted elsewhere herein, standards for what is considered satisfactory may be varied based on external factors, such as available staff and work load.

In a Recover Step 260 Recovery Logic 169 is used to recover from poor performance (unsatisfactory) of the requested service. Recover Step 260 is optionally automatically performed based on the results of Receive Feedback Step 252. In Recover Step 260, Recovery Logic 169 provides compensation to the guest in order to offset poor performance. Recovery Logic 169 is optionally configured to provide the compensation promptly after the poor performance is noted. For example, in various embodiments, the process of providing the compensation starts within 24 hours, 12 hours, 3 hours, 1 hour or 30 minutes after noting the poor performance in Receive Feedback Step 252. The compensation can include, for example, a future discount, a refund, a free service, a personal communication, and/or the like.

In an optional Bill Step 265 the guest's financial account is billed for the completed service, using Billing Logic 178. The amount billed can include a discount determined in Recover Step 260, or a tip indicated by the guest using Guest Device 120, Room Device 130 or IoT Device 140.

Now, referring to steps performed by the guest, as illustrated in FIG. 2:

In a Discover Step 210 the guest discovers one or more available services. Typically, these are presented to the guest on a menu, e.g., on Guest Device 120, Room Device 130 and/or IoT Device 140.

In a Request Step 215 the guest requests one of the available services. This request is optionally made by providing an input to one of the above devices. For example, a guest may click on a menu item in a menu generated by Guest Interface Logic 154. In some embodiments, requests for services can be made in the form of narrative text, for example, via a text message.

In a Wait Step 227 the guest waits for the service to be provided. During this time the guest optionally receives one or more notices regarding progress of the service from Request State Logic 160 via Guest Interface Logic 154. In some embodiments, Request State Logic 160 is configured to provide the progress notices in response to changes in state of the service request. The notices may be provided via text, browser, and/or application interface.

In a Receive Step 240 the service (which may include a product) is received by the guest. In receive Step 240, the guest is optionally requested to acknowledge receipt of the service and/or to provide feedback regarding the service.

In an optional Consume Step 237 the guest consumes the service. For example, the guest may eat a meal or watch a movie.

In optional Feedback Step 250 the guest provides feedback relating to the provided service. The feedback is optionally provided to Feedback Logic 166 via Guest Interface Logic 154. As noted herein the feedback can include narrative text or rating on a scale. Feedback and/or requests for feedback may be provided via an application interface, a browser or text messages. For example, Guest App 123 is optionally configured to communicate requests for feedback and resulting guest responses. The received feedback is optionally real-time feedback, e.g., feedback that is received within 10, 5, 2, 1, 0.5 or 0.2 hours of completion of a service request.

In an optional Receive Step 262 the guest receives a compensation for a poorly provided service. The amount and/or type of compensation are optionally determined by Recovery Logic 169 based on a score generated by Analysis Logic 172. For example, a meal that is delivered 10 minutes late may be discounted by 10%, while a meal that is delivered cold and an hour late may receive a 100% discount. As discussed herein, compensation can take a wide variety of forms. In some embodiments, compensation includes an automatic call or text message from a manager to a guest.

Figure 3:
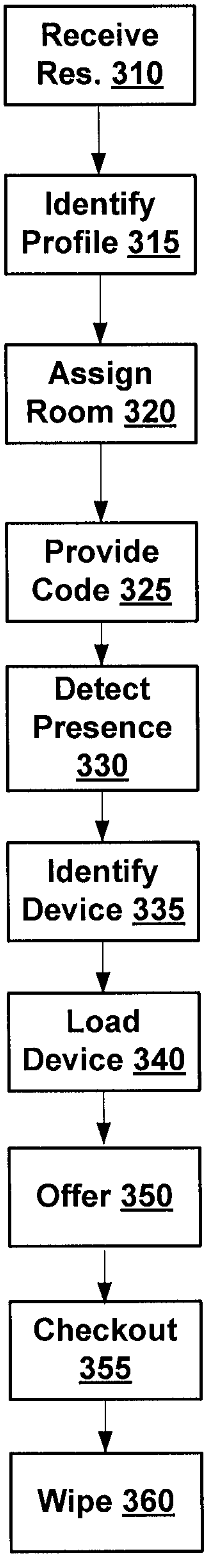
FIG. 3 illustrates methods of provisioning computing devices, according to various embodiments of the invention.

FIG. 3 illustrates methods of provisioning computing devices, according to various embodiments of the invention. In these methods computing instructions and/or configuration data are provided to Access Control 135, Guest Device 120, Room Device 130, and/or IoT Device 140. As with the other examples provided herein, there may be multiple instances of each of these devices associated with a particular reservation. The computing instructions and configuration data provisioned are optionally specific to a guest. For example, they may include an application used by the guest and/or personal data of the guest. In some embodiments, the devices are provisioned to access personal accounts or services of the guest. For example, the computing devices may be provisioned to automatically login to a guest's ebook subscription, newspaper subscription, amazon prime account, e-mail account, and/or the like.

In a Receive Reservation Step 310 a reservation is received by Guest Management System 100. The reservation is optionally received from a property management system via PMS Bridge 145. Typically, the reservation will include information such as the name of the guest(s), dates and length of stay, room type, number of people in the party, price paid, etc. In some embodiments, the reservation information also includes an identifier of a guest's profile stored in Storage 194. This identifier may be a guest specific account number for Guest Management System 100. In alternative embodiments, a reservation may be received from Guest Device 120. In these embodiments, the reservation may be associated with an identifier of Guest Device 120.

In an Identify Profile Step 315 a profile of the guest is identified based on information received as part of the reservation. The profile optionally includes an identity of Guest Device 120, applications used by the guest, a history of services used by the guest, personal data of the guest, and/or the like. The personal data may include religious affiliation, gender, spending patterns, gamming habits, browser favorites, account identifiers, login data, e-mail profiles, credentials, application configuration data, and/or the like. The profile may include data received from multiple stays at different facilities. For example, the guest may have stayed at several separate facilities and a history of their stay at each of these facilities may be part of their profile. The profile may be retrieved from Storage 194. Identify Profile Step 315 is optionally performed using Management Logic 187.

In some embodiments, the profile further includes medical information. For example, emergency medical information, prescription information, supervision/assistance needs, America Disability Act requirements, medical information used for medical treatment, dietary needs, medical history, and/or the like. Where a facility managed by Guest Management Service 100 is a hospital, hospice, or other medical facility, the profile can include a treatment plan, identities of assigned service providers (e.g., doctors and nurses), identities of friends and family members, and/or other information related to medical treatment.

In an Assign Room Step 320 a room (or other space) is assigned to the guest for the duration of the reservation. For example, a specific room at a motel or a cabin on a ship may be assigned to the guest. The assigned room is typically associated with particular instances of Room Device 130 and/or IoT Device 140. Assign Room Step 320 is optionally performed using Management Logic 187 and/or PMS Bridge 145. Receive Reservation Step 310 and Assign Room Sep 320 are optionally performed using Management Logic 187 and/or PMS Bridge 145.

In a Provide Code Step 325 a lock and/or room code is provided to Guest Device 120. This code is configured for controlling Access Control 135 and thus providing access to the assigned room. In some embodiments, code is not provided until the guest is checked into the facility. In other embodiments, the code is provided to Guest Device 120 prior to check-in but Access Control 135 is not configured to accept the code until check-in. The provided code is optionally based on a private/public encryption key pair. This encryption key pair is optionally generated within Access Control 135. Provide Code Step 325 optionally includes using an Secure Socket Layer (SSL) channel between Guest App 123 and Guest Management Server 110. Provide Code Step 325 is optionally performed using Management Logic 187 and/or Provisioning Logic 178.

In an optional Detect Presence Step 330, presence of Guest Device 120 at or near the facility is detected. This detection may occur by Guest App 123 reporting a GPS location, by communication between a local wireless network of the facility and Guest Device 120, by the guest entering an instruction in Guest App 123, by a service provider (e.g., valet or desk clerk) noting arrival of the guest, and/or the like. In some embodiments, the guest need not be near the facility to check-in. Detect Presence Step 330 is optionally performed using Management Logic 187.

In an Identify (Room) Device Step 335 the identity of Guest Device 120, Room Device 130 and/or IoT Device 140 is determined. For example, the MAC, Internet Protocol or Ethernet address of Room Device 130 in the room assigned in Assign Room Step 320 may be identified such that instructions and/or data can be communicated to Room Device 130 in preparation for arrival of the guest.

In a Load (Room) Device Step 340 instructions and/or data are provisioned on to those devices identified in Identify Device Step 335. For example, Room Device 130 and IoT Device 140. As noted elsewhere herein, the material provisioned can include a wide variety of information, including personal information of the guest. In some embodiments, Load Device Step 340 includes testing of login credentials and/or certificates prior to actual use by the guest. For example, Provisioning Logic 178 may be configured to test that login credentials work as expected. Identify Device Step 335 and Load Device Step 340 are optionally performed using Provisioning Logic 178.

Load Device Step 340 optionally includes provisioning of Guest Device 120 and/or IoT Device 140. Further, Load Device Step 340 optionally includes automatic establishment of a VPN network including Guest Device 120, Room Device 130, and/or IoT Device. The VPN can Load Device Step 340 may be performed by Provisioning Logic 176 and/or VPN Logic 181.

In an Offer Step 350 one or more services are offered to the guest. Offer Step 350 is optionally an embodiment of Offer Step 212. Offer Step 350 is optionally followed by the steps illustrated in FIG. 2. As noted elsewhere herein, the "services" offered can include products.

In an optional Checkout Step 355 the guest is checked out. Checkout Step 355 can include detecting that a guest has left a facility, receiving a command from a service provider (e.g., a desk clerk), and/or receiving an instruction from Guest App 123 that the guest is checking out. In some embodiments, such as when the facility is a hospital and the guest is a patient, Checkout Step 355 includes a workflow of discharge steps that can be considered a service provided to a guest. Checkout Step 355 is optionally performed using PMS Bridge 145, Management Logic 187, and/or Billing Logic 175.

In an optional Wipe Step 360, any information particular to the guest is removed from Room Device 130 and/or IoT Device 140. Wipe Step 360 is performed so as to maintain the security of confidential information of the guest. Specifically, any accounts to which the guest is logged into from these devices are logged out and information such as login credentials are removed from these devices such that the accounts of the guest are secure. In some embodiments, Wipe Sep 360 is prescheduled to occur at or shortly after an expected checkout time and date, and at least part of the logic configured to perform the wipe is preloaded onto each devices. Thus, the wipe will occur at the designated time even if the device is not connected to Network 115. This approach assures that any confidential information is removed from Room Device 130 and IoT Device 140. Wipe Step 360 is optionally performed using Provisioning Logic 178.

Figure 4:
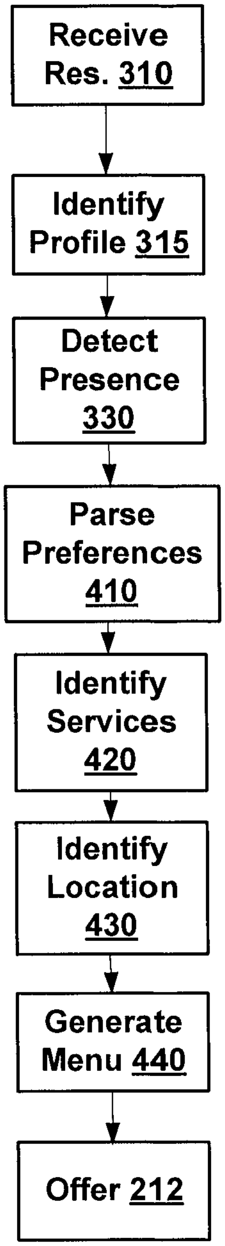
FIG. 4 illustrates a method of generating and providing a services menu, according to various embodiments of the invention.

FIG. 4 illustrates a method of generating and providing a services menu, according to various embodiments of the invention. The services menu is based on a guest's profile and/or a location of the guest. The services menu is optionally provided and generated to the guest using Guest Interface Logic 154 and Network 115.

Receive Reservation Step 310, Identify Profile Step 315, Detect Presence Step 330 are optionally performed as discussed elsewhere herein. Identify Profile step 315 typically includes retrieving an identification of at least one Guest Device 120 of the guest from the user's profile stored in Storage 194.

In a Parse Preferences Step 410 guest preferences stored in the guest profile are parsed. These preferences may be passed on a history of services requested by the guest. For example, the preferences may include types of food & drink the guest likes, entertainment the guest prefers, activities the guest engages in, and/or the like.

In an Identify Services Step 420 available services are identified. These services may include those offered by the facility and/or those offered by 3$^{rd}$ parties. For example, Identify Services Sep 420 may include determining food items available from an off-site restaurant, checking a spa schedule, checking a cabana reservation schedule, parsing a gift shop inventory, and/or the like.

In an optional Identify Location Step 430 a location of Guest Device 120 is determined. As discussed elsewhere herein the location may be determined using Management Logic 187 and a radio based system, e.g., GPS or WiFi. In some embodiments, Identify Location Step 430 includes identifying a location of the guest based on facial recognition and a video monitoring system.

In a Generate Menu Step 440 a menu is generated based on the preferences of the guest and the identified available services. The menu may be further based on a location of Guest Device 120, a reservation type and length, a time of day, special offers, and/or the other factors discussed herein.

In Offer Step 212 the menu generated in Generate Menu Step 440 is offered to the guest via Guest Device 120, IoT Device 140, Room Device 130, and/or Marquee 138. In some embodiments, the menu may be offered via other devices within the facility. For example, a menu may be provided on a tablet computer in a dining room. Offer Step 212 is optionally an embodiments of Offer Step 350 and may be followed by the steps illustrated in FIGS. 2 and 3. Generate Menu Step 440 and Offer Step 212 are optionally performed using Guest Interface Logic 154.

The steps illustrated in FIGS. 2-4 are optionally performed in alternative orders.

Several embodiments are specifically illustrated and/or described herein. However, it will be appreciated that modifications and variations are covered by the above teachings and within the scope of the appended claims without departing from the spirit and intended scope thereof. For example, while hotels, resorts and hospitals are provided as an example herein. Guest Management System 100 may be adapted to ships, trains, aircraft, transport services (e.g., Uber®), and/or any other situation in which assets are reserved and/or services are consumed. Further, while the systems and methods discussed herein include examples in which a guest specifically requests a product/service, the scope of various embodiments are meant to include products and services that are provided to the guest without the need for the guest to make a specific request. For example, the making up of a room is typically a service that does not require a specific request from a guest, but can instead be generated by Management Logic 187. Such requests may be managed, tracked and scored, etc. as described herein for guest generated service requests.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of generating and providing a services menu, the method comprising:
- receiving, by a guest management system, a room reservation request including guest information for a guest for whom the room reservation is being made;
- identifying a guest profile based on the information, including retrieving an identification of a guest device from the guest profile;
- assigning a room in a facility to the guest;
- detecting a presence of the guest device at or near the facility; and in response to detecting the presence of the guest device, performing the steps of
- parsing preferences stored in the guest profile;
- identifying available services;
- determining a location of the guest device; and
- generating a menu based on the parsed preferences, the location, and the identified available services.

2. The method of claim 1 further comprising providing the menu to be displayed on the guest device.

3. The method of claim 1 further comprising providing the menu to be displayed on a communication device associated with the room.

* * * * *